April 10, 1962     I. M. ALGUIRE     3,028,875
SYSTEM FOR DRAINING AND REPLENISHING WATER OR OTHER LIQUIDS
Filed April 30, 1959     2 Sheets-Sheet 1
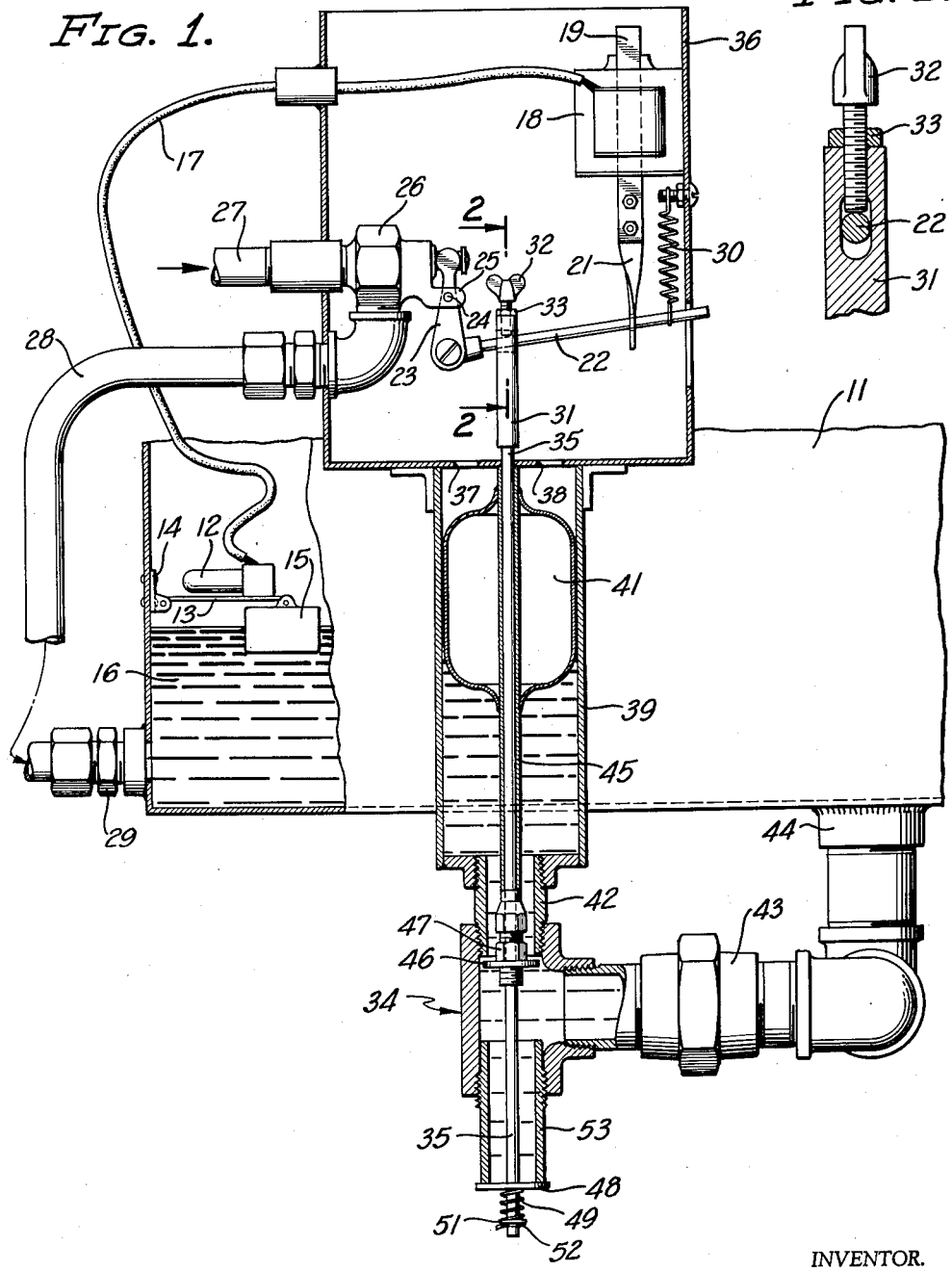
INVENTOR.
IVAN M. ALGUIRE
BY
ATTORNEY April 10, 1962  I. M. ALGUIRE  3,028,875
SYSTEM FOR DRAINING AND REPLENISHING WATER OR OTHER LIQUIDS
Filed April 30, 1959  2 Sheets-Sheet 2

INVENTOR.
IVAN M. ALGUIRE
BY
ATTORNEY

United States Patent Office 3,028,875
Patented Apr. 10, 1962

3,028,875
SYSTEM FOR DRAINING AND REPLENISHING WATER OR OTHER LIQUIDS
Ivan M. Alguire, Riverside, Calif.
(5543 Molino Way, Rubidoux, Calif.)
Filed Apr. 30, 1959, Ser. No. 809,949
5 Claims. (Cl. 137—391)

This invention relates to a system for draining and replenishing water or other liquids in a storage tank and more particularly to a system including a float switch and valve arrangement for draining water from a water storage tank and replenishing the water at periodic intervals.

Many devices have been utilized in the past for maintaining the water in a water storage tank or other liquids in a suitable container at a constant level. However, none of these devices provided for a complete drainage, flushing and replenishing of the liquid at periodic intervals.

One preferred embodiment of the present invention consists essentially of a float switch and valve mechanism adapted to be utilized in combination with a storage tank for water or other liquids. A float switch, such as a mercury switch pivotally mounted on the tank and supported by a float, is adapted to actuate a solenoid, when the liquid level drops below a certain point. The solenoid, through a lever mechanism, opens an outlet valve and actuates an inlet valve which admits liquid to the lower portion of the tank at a suitable point causing a swirling and scrubbing action to eliminate the old and contaminated liquid from the bottom of the tank. When the liquid level drops to a certain point, an auxiliary drainage valve is closed and the liquid continues to flow into the tank, until it reaches the proper level, at which time the float switch opens to cut off the solenoid which is returned to its normal position thus closing the inlet valve and returning the first drainage valve to its original closed position.

One object of the present invention is to provide a system for cleaning and flushing a liquid storage tank and at the same time refilling the tank at periodic intervals after a certain amount of water has been used.

Another object of the present invention is to provide a system including a float switch and valve mechanism for use in association with a water storage tank for draining water therefrom and replenishing the water at periodic intervals.

Other objects and advantages of the present invention will be apparent from the following description and drawings wherein—

FIGURE 1 is a view partially in section illustrating one preferred embodiment of the present invention;

FIGURE 2 is a detailed sectional view taken on the line 2—2 of FIGURE 1;

Figure 3:
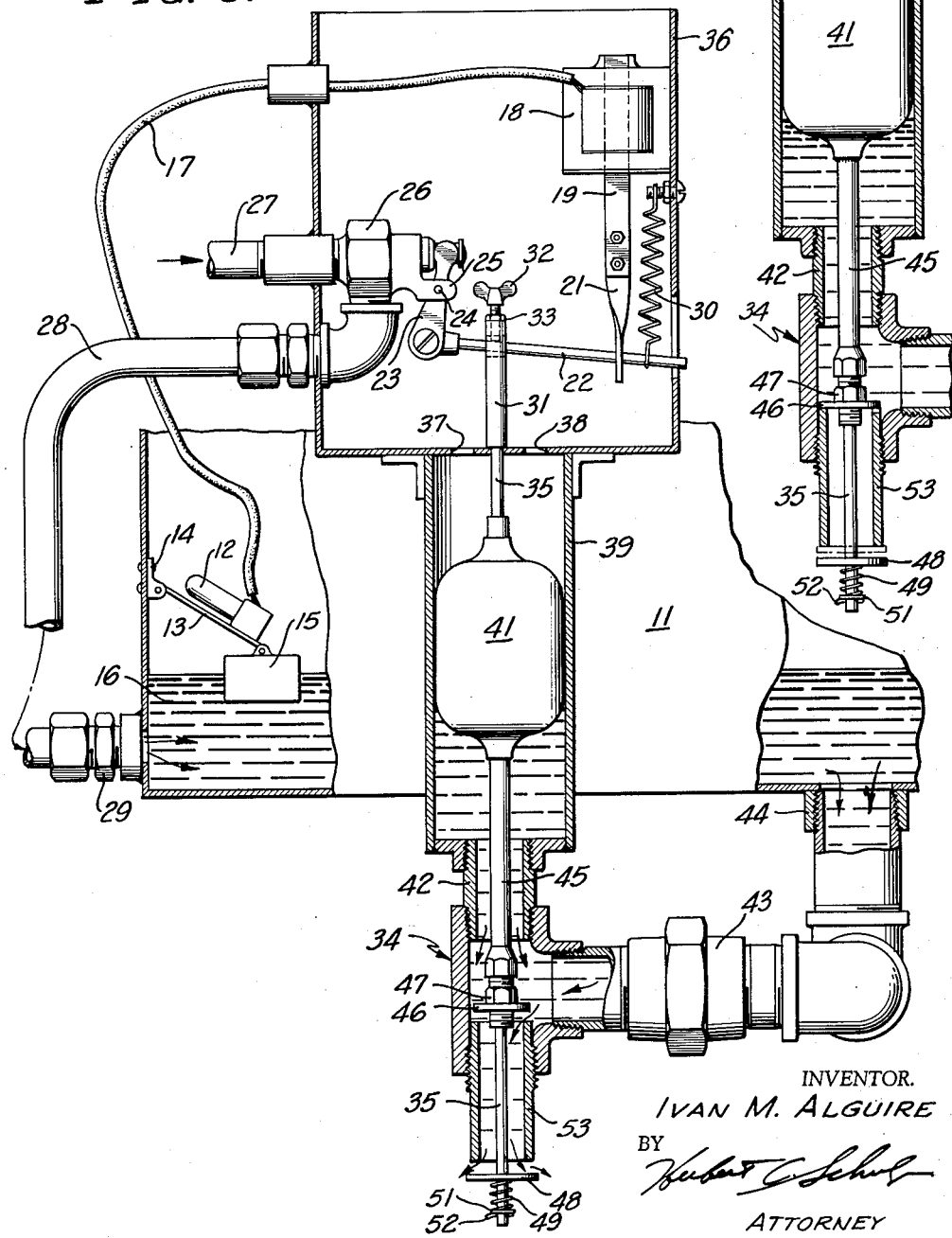
FIGURE 3 is a view similar to FIGURE 1 and illustrating the float switch and valve mechanism in the flushing position.

Referring now to the drawings in detail and more particularly to FIGURE 1, a water storage tank 11 is illustrated with portions broken away and one corner shown in partial section to show the mounting of a suitable tilt switch such as the mercury switch 12 which is rigidly mounted on a lever 13 pivotally mounted on a bracket 14 which is suitably attached to a side wall of the tank by conventional means such as rivets, or bolts and nuts. The other end of the lever 13 is supported by a float 15 which is buoyantly supported on the surface of the water or other liquid 16.

The mercury switch 12 is connected by means of the wires 17 to a solenoid 18 to actuate the armature 19. The armature 19 extends downwardly and has attached thereto an arm 21 with an opening through which extends a rigid arm 22 mounted on the lever 23 which is pivotally mounted at 24 on the bracket 25 of the inlet valve 26.

It will be apparent that operation of the inlet valve 26 will permit water from the pipe 27 to flow through the pipe 28 into a tank through a suitable fitting 29.

The arm 22 is resiliently urged upwardly by the spring 30, and, as illustrated in FIGURE 1 and also in the detailed view of FIGURE 2, extends through a slotted opening in a cylindrical actuator 31 which is provided with a thumb screw 32 and a lock nut 33 for fine adjustment of the operation of the drainage or outlet valve 34 through the rod 35.

The solenoid 18 and inlet valve 26 with their associated mechanisms are mounted in an open housing 36 of suitable configuration which may be mounted by conventional means on the side of the storage tank 11, and is provided with two vent openings 37 and 38 in the bottom wall which lead into a cylindrical well 39 which houses and slidably mounts a float 41 for vertical movement therein.

A cylindrical well 39 communicates through a nipple 42 with the drainage valve 34 and through the pipes and fittings 43 to a drainage connection 44 on the bottom of the tank 11. Thus the water or other liquid in tank 11 will communicate with the cylindrical well 39 and the float 41 will maintain a position corresponding to the water level in the tank 11.

The float 41 is mounted rigidly on a tubular member 45 which surrounds the rod 35 and is adapted to slide vertically relative thereto.

A circular disk or valve body 46 is threaded on the lower end of the tubular member 45 and may be adjustably fixed in position by means of the lock nut 47 so that it does not seat against the lower end of the nipple 42, as shown in FIGURE 1. This permits liquid to flow around the disk for reasons which will become apparent.

The rod 35 extends through the lower end of the tubular member 45 and is provided with another circular disk or valve body 48 which is loosely and slidably mounted thereon and urged upwardly by the spring 49 which is held on the lower end of the rod 35 by the washer 51 and a cotter pin 52.

In the operation of the system of the present invention and with particular reference to one preferred use of the present invention in connection with evaporative coolers which recirculate water over a period of time, the water in the tank 11 will be gradually evaporated by the cooler and it will also be contaminated by dirt and other foreign matter which it picks up during use. The water level in tank 11 will drop gradually to a point where the float 15 moves down sufficiently to tilt the mercury switch 12 to its closed position and thus actuates the solenoid 18 to depress the armature 19 and the arm 21 thus depressing the arm 22 of lever 23 and opening the inlet valve 26. Water flowing through the pipe 28 and connection 29 into the lower portion of the tank 11 will create a swirling effect and a scrubbing action on the tank which cleans the tank and agitates the remaining water left therein.

At the same time the arm 22 depresses the actuator 31 and rod 35 lowering the valve disk 48 and opening the drainage valve as illustrated in FIGURE 3 to thus flush out the dirty water remaining in the tank as the fresh water enters and swirls around in the bottom of the tank.

Figure 4:
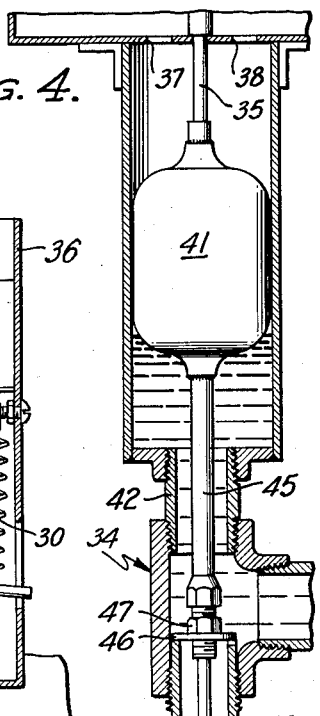
FIGURE 4 is a detailed view of the drainage valve in a third position for refilling the tank with the drainage valve closed.

Since the water entering the tank will be less in volume than the water drained out through the drainage valve 34 and water will flow out of well 39 past disk 46, the float 41 will drop down to the point illustrated in FIGURE 4, where the valve disk 46 will seat on the upper end of the sleeve 53 which is threaded into the lower portion of the valve 34. Since the pressure of the water on the top of the disk 46 will be much greater than the atmospheric pressure on the bottom thereof the valve disk 46 will remain seated on the upper end of the sleeve 53 for the period during which the tank refills to its normal level, even though the water entering the cylindrical well 39 urges the float 41 upwardly therein the float 41 has very little buoyancy. It will not lift a disc 46 easily from slight filling of well 39. Disk 46 can never seat at the lower end of nipple 42 as has been pointed out heretofore and it is prevented from so seating by adjustment of "lock-nut" 47 as previously described.

When the water level returns to its normal level, as indicated in FIGURE 1, the mercury switch 12 will be opened and the solenoid will be deenergized thus permitting the armature 19 to return to its normal position through the action of the spring 30 which is connected to the outer end of the arm 22. This will close the inlet valve 26 and also return the rod 35 to its upper position with a snap action to seat the valve disk 48 against the lower end of the sleeve 53 thus cutting off the flow of liquid through the drainage valve 34. At the same time the differential pressure on the valve disk 46 will be gradually relieved by leakage past the valve disk 46 and the buoyant effect of the water in the cylindrical sleeve 39 on the float 41 will return the valve disk 46 to its original position as illustrated in FIGURE 1.

If desired, a very fine groove may be formed on the upper end of sleeve 53 or the mating surface of disk 46 to provide a very small amount of controlled leakage which will permit float 41 to raise disk 46 to its original position in FIGURE 1, but not enough to impair its function of cutting off the discharge of liquid in the position of FIGURE 4.

Other variations and modifications will be apparent within the scope of the invention, as defined by the following claims.

What is claimed is:

1. In a system for draining and replenishing liquid in a storage tank having an inlet valve comprising an inlet, an outlet, and flow control means therefor, and an outlet valve comprising an inlet, an outlet, and flow control means therefor, the improvement comprising means responsive to a predetermined drop in liquid level in said tank for simultaneously opening said inlet valve and actuating a first body portion of the outlet valve control means to open said outlet valve, and means responsive to a further determined drop in liquid level for actuating a second valve body portion of the outlet valve flow control means and closing said outlet valve, said first means also being subsequently responsive to an increase in liquid level to a predetermined point, for closing said inlet valve and returned said first body portion to its original position.

2. In a system for draining and replenishing liquid in a storage tank having an inlet valve comprising inlet, an outlet, and flow control means therefor, and an outlet valve comprising an inlet, an outlet and flow control means therefor, the improvement including two valve bodies, including means responsive to a predetermined drop in liquid level for simultaneously opening said inlet valve and a first valve body portion of said outlet valve flow control mean for opening said outlet valve, and float means responsive to a further predetermined drop in liquid level for actuating a second valve body portion of said outlet valve control means and closing said outlet valve, said first means also being subsequently responsive to an increase in liquid level to a predetermined point for closing said inlet valve and returning said first valve body portion to its original position.

3. In a system for draining and replenishing liquid in a storage tank having an inlet valve comprising an inlet, and outlet valve comprising an inlet, an outlet, and flow control means therefor, the improvement comprising, a float mounted in said storage tank, a switch operable associated with said float, a solenoid connected to said switch and having a movable armature, said armature being operatively connected to said inlet valve and a first valve body portion of the outlet valve control means for opening both valves when said switch has its contacts closed by a drop of liquid level to a predetermined point, a second float adapted to rise and fall with the liquid level in said tank, and a second valve body portion of the outlet valve control means operably connected to said second float and adapted to nearly but not completely close said outlet valve when the liquid in said tank has reached a predetermined low point, said switch also being operable to close said inlet valve and returning said first valve body portion to its original position when the liquid level returns to a predetermined highpoint.

4. In a system for draining and replenishing liquid in a storage tank having an inlet valve comprising an inlet, an outlet, and flow control means therefor, and an outlet valve comprising an inlet, and outlet, and flow control means therefor, the improvement comprising a float pivotally mounted on said storage tank at a predetermined level, a tilt switch mounted on said float, a solenoid connected to said switch and having a movable armature, said armature being operably connected to said inlet and outlet valves for opening both valves when said switch is tilted and its contacts closed by a drop of liquid level to a predetermined point, a second float adapted to rise and fall with the liquid level, and a secondary outlet valve operatively connected to said float and adapted to close when the liquid in said tank has reached a predetermined low point, said switch also being operable to close said inlet valve and said first outlet valve when the liquid returns to a predetermined high.

5. In a system for draining and replenishing liquid in a storage tank having an inlet valve comprising an inlet, an outlet, and flow control means therefor, and an outlet valve comprising an inlet, an outlet and flow control means therefor, the improvement comprising a float pivotally mounted on said storage tank at a predetermined level, a tilt switch mounted on said float, a solenoid connected to said switch and having a vertically movable armature, said armature being operably connected to said inlet and outlet valves for opening both valves when said switch is tilted and its contacts closed by a drop of liquid level to a predetermined point, a second float mounted in a well communicating with said tank and adapted to rise and fall with the liquid level, and a secondary outlet valve operably connected to said second float and adapted to close when the liquid in said tank has reached a predetermined low point, said switch also being operable to close said inlet valve.

References Cited in the file of this patent

UNITED STATES PATENTS

| | | |
|---|---|---|
| 1,200,961 | Mabe et al. | Oct. 10, 1916 |
| 1,998,478 | Williams | Apr. 23, 1935 |
| 1,999,439 | Braun | Apr. 30, 1935 |
| 2,018,169 | Williams | Oct. 22, 1935 |
| 2,335,716 | Weeden | Nov. 30, 1943 |
| 2,658,520 | Ribeiro | Nov. 10, 1953 |